(12) United States Patent
Tokunaga et al.

(10) Patent No.: US 8,732,292 B2
(45) Date of Patent: May 20, 2014

(54) NETWORK SYSTEM

(75) Inventors: Yoshihiko Tokunaga, Amagasaki (JP);
Tomoyuki Hatanaka, Kitakatsuragi-gun (JP); Tomohiro Oda, Osaka (JP);
Yoshiyuki Komoda, Suita (JP)

(73) Assignee: Panasonic Corporation, Osaka (JP)

( * ) Notice: Subject to any disclaimer, the term of this patent is extended or adjusted under 35 U.S.C. 154(b) by 323 days.

(21) Appl. No.: 13/401,889

(22) Filed: Feb. 22, 2012

(65) Prior Publication Data

US 2012/0150937 A1    Jun. 14, 2012

Related U.S. Application Data

(62) Division of application No. 12/162,752, filed as application No. PCT/JP2007/056639 on Mar. 28, 2007, now Pat. No. 8,219,658.

(30) Foreign Application Priority Data

Mar. 28, 2006   (JP) ................................ 2006-089600
Mar. 31, 2006   (JP) ................................ 2006-100489

(51) Int. Cl.
*H04L 9/32*      (2006.01)
*H04L 12/24*     (2006.01)

(52) U.S. Cl.
CPC .................................. *H04L 41/0213* (2013.01)
USPC ....................................................... 709/223

(58) Field of Classification Search
USPC ........................................................... 709/223
See application file for complete search history.

(56) References Cited

U.S. PATENT DOCUMENTS 5,892,924 A    4/1999   Lyon et al.
5,920,705 A    7/1999   Lyon et al.
(Continued)

FOREIGN PATENT DOCUMENTS

JP    8-235050 A    9/1996
JP    9-218831 A    8/1997
(Continued)

OTHER PUBLICATIONS

Corcoran, Peter et al., "Browser-Style Interfaces to a Home Automation Network", IEEE Transactions on Consumer Electronics, 1997, vol. 43, No. 4, pp. 1063-1069.

(Continued)

*Primary Examiner* — Peter Shaw
(74) *Attorney, Agent, or Firm* — Renner, Otto, Boisselle & Sklar, LLP

(57) ABSTRACT

A network system suitable for remote monitoring or remote control of equipments is provided. When an execution of a server-side object is requested from a client terminal device to a server, the server requests an execution of an equipment-side object to the equipment(s). The execution request of the server-side object from the client terminal device is performed by use of a first identifier assigned to the server-side object, and the execution request of the equipment-side object is performed by use of a second identifier assigned to the equipment-side object. Since the server has an identifier setting function of setting a correspondence relation between the first identifier and the second identifier, it is possible to reduce burden on the client terminal device, and flexibly cope with cases of exchanging and increasing the equipment(s) in the network system without considering specific identification information of the equipments such as IP address.

6 Claims, 9 Drawing Sheets

(56) References Cited

U.S. PATENT DOCUMENTS

| | | |
|---|---|---|
| 6,922,721 B1 | 7/2005 | Minborg et al. |
| 6,996,072 B1 | 2/2006 | Minborg |
| 2001/0027109 A1 | 10/2001 | Minborg et al. |
| 2002/0021696 A1 | 2/2002 | Minborg |
| 2002/0083172 A1 | 6/2002 | Knowles et al. |
| 2003/0050052 A1 | 3/2003 | Minborg et al. |
| 2003/0135586 A1 | 7/2003 | Minborg et al. |
| 2003/0236824 A1 | 12/2003 | Alsafadi et al. |
| 2005/0271041 A1 | 12/2005 | Minborg et al. |
| 2006/0047541 A1 | 3/2006 | Li |
| 2006/0062162 A1 | 3/2006 | Minborg |
| 2006/0114845 A1 | 6/2006 | Minborg |
| 2007/0088855 A1 | 4/2007 | Nanki et al. |
| 2007/0124481 A1 | 5/2007 | Bloebaum et al. |
| 2007/0127645 A1 | 6/2007 | Bloebaum et al. |
| 2007/0129074 A1 | 6/2007 | Bloebaum et al. |
| 2007/0133572 A1 | 6/2007 | Bloebaum et al. |
| 2007/0226240 A1 | 9/2007 | Bloebaum et al. |
| 2007/0230676 A1 | 10/2007 | Bloebaum et al. |
| 2007/0230678 A1 | 10/2007 | Bloebaum et al. |
| 2007/0237320 A1 | 10/2007 | Bloebaum et al. |
| 2007/0237321 A1 | 10/2007 | Bloebaum et al. |
| 2007/0258553 A1 | 11/2007 | Bloebaum et al. |
| 2007/0259655 A1 | 11/2007 | Minborg et al. |
| 2008/0062893 A1 | 3/2008 | Bloebaum et al. |
| 2009/0143087 A1 | 6/2009 | Minborg et al. |
| 2009/0149165 A1 | 6/2009 | Minborg et al. |

FOREIGN PATENT DOCUMENTS

| | | |
|---|---|---|
| JP | 10-198642 A | 7/1998 |
| JP | 2002-501244 A | 1/2002 |
| JP | 2003-60664 A | 2/2003 |
| JP | 2005-149456 A | 6/2005 |
| KR | 10-2006-0008423 A | 1/2006 |
| RU | 2 189 072 C2 | 6/2000 |
| RU | 2 271 615 C2 | 1/2004 |
| WO | WO-99/35856 A2 | 7/1999 |

OTHER PUBLICATIONS

Desbonnet, Joe et al., "System Architecture and Implementation of a CEBus/Internet Gateway", IEEE Transactions on Consumer Electronics, 1997, vol. 43, No. 4, pp. 1057-1062.

Corcoran, Peter, "Mapping Home-Network Appliances to TCP/IP Sockets Using a Three-Tiered Home Gateway Architecture", IEEE Transactions on Consumer Electronics, 1998, vol. 44, No. 3, pp. 729-736.

Kirihara, Yukihiko et al., "Proactive ni dosa suru kaden kiki seigyo kikoe Proactive Control Scheme for Electronic Home Appliances", Information Processing Society of Japan. Oct. 2000, vol. 61, pp. 287-288.

International Search Report for the Application No. PCT/JP2007/056639 mailed Jun. 26, 2007.

Notification of Reasons for Refusal for the Application No. 2006-089600 from Japan Patent Office mailed Setember 11, 2007.

Notification of Reasons for Refusal for the Application No. 2006-100489 from Japan Patent Office mailed Sep. 11, 2007.

Official Action for the Application No. RU 2008131535/09(039372) from Russian Patent Office dated Nov. 12, 2009.

Korean Office Action for the Application No. 10-2008-7018252 from Korean Intellectual Property Office dated Sep. 30, 2010.

Supplementary European Search Report for the Application No. EP 07 74 0077 dated Oct. 4, 2010.

NETWORK SYSTEM

CROSS REFERENCE TO RELATED APPLICATIONS

This application is a Divisional Application of patent application Ser. No. 12/162,752, filed on Jul. 30, 2008, which is a 371 application of Application No. PCT/JP2007/056639, filed Mar. 28, 2007, which is based on Japanese Application Nos. JP2006-089600 and JP2006-100489, filed Mar. 28, 2006 and Mar. 31, 2006, respectively, the entire contents of which are hereby incorporated by reference.

TECHNICAL FIELD

The present invention relates to a network system for enabling remote monitoring and remote control of equipments connected to a network from a client terminal device through a server.

BACKGROUND ART

In the past, a system for controlling/monitoring equipments connected to a non-IP network by a terminal device connected to an IPv6 network has been proposed. This system has a gateway for enabling communication between the equipments for the non-IP network and the terminal device for the IPv6 network by acquiring identification information and interface IDs of the equipments used in the non-IP network as well as network IDs used in the IPv6 network, generating IPv6 addresses from these IDs, and managing a correspondence between the generated addresses and the identification information. By use of this gateway, the terminal device can control or monitor the equipments.

For example, this kind of network system is disclosed in Japanese Patent Early Publication No. 2003-60664. In this system using non-IPv6 equipments, a terminal device for an IPv6 network sends a packet with a header including destination IPv6 address. In a gateway, an IPv6 address is allocated to a non-IPv6 equipment. Therefore, when the terminal device accesses plural equipments, it becomes necessary to generate the IPv6 address corresponding to each of the equipments. Thus, it is needed to take account of the IPv6 address. In addition, even when increasing the number of the equipments for performing the same operation, another IPv6 address corresponding to the added equipment becomes necessary. Therefore, there are inconveniences that the plural equipments cannot be controlled or monitored by use of a single identifier, and plural identifiers cannot be allocated to a single equipment. Furthermore, it is not possible to flexibly cope with an increase in the number of the equipments for providing services.

SUMMARY OF THE INVENTION

Therefore, in consideration of the above problems, a primary concern of the present invention is to provide a network system suitable to control or monitor equipment(s), which is capable of flexibly cope with increasing the number of equipments in the network system without taking account of specific identification information such as IP address for the equipments in network communication, and also increasing or decreasing a service provided to a client terminal device with no change of the equipments.

That is, the network system of the present invention comprises at least one equipment, a client terminal device, and a server connected between the equipment and the client terminal device via a network, and configured such that the client terminal device requests an execution of a server-side object to the server, and then the server requests an execution of an equipment-side object to the equipment. The execution request of the server-side object from the client terminal device is performed by a first identifier assigned to the server-side object, and the execution request of the equipment-side object from the server is performed by a second identifier assigned to the equipment-side object. The second identifier comprises at least one identifier defined according to a function of the equipment, which executes the equipment-side object according to the execution request of the server-side object using the first identifier from the client terminal device, and the server has an identifier setting portion configured to set a correspondence relation between the first identifier and the second identifier.

According to the network system of the present invention, a client (i.e., a user) enables controlling or monitoring the equipment(s) without taking account of specific identification information such as IP address for the equipments used in network communication. For example, a same service can be provided from plural equipments by assigning a same second identifier to objects of the plural equipments. Alternatively, when a single equipment has a plurality of objects with different second identifiers, it becomes possible to selectively provide a specific service by a specific equipment. That is, a wide variety of services can be provided from the equipments without changing communication traffic between the server and the client terminal device. In addition, it is possible to flexibly and easily cope with a case where the equipment(s) is changed or the number of the equipments is increased or decreased in the network system, by simply changing the correspondence relation between the first identifier and the second identifier. Furthermore, since it is not necessary to associate an application of the client terminal device with plural equipment-side objects, there is an effect of reducing burden on the client terminal device.

In the above network system, it is preferred that the number of the second identifier of the equipment-side object associated with the first identifier of the server-side object, that is, the number of the equipment-side object associated with the server-side object is increased or decreased in response to an increase or decrease in the number of services provided when the equipment executes the equipment-side object according to the execution request of the server-side object from the client terminal device.

In the above network system, it is preferred that the second identifier includes at least one of a unique identifier of the equipment-side object and an interface identifier defined according to a function of the equipment, and the correspondence relation between the first identifier and at least one of the unique identifier and the interface identifier of the second identifier is set in the identifier setting portion. In the case of using only the unique identifier as the second identifier, it is possible to provide a service obtained when a specific equipment executes the equipment-side object. In the case of using only the interface identifier as the second identifier, it is possible to provide a service obtained when plural equipments having a same service function execute the equipment-side object.

In a preferred embodiment of the above network system, the first identifier includes a unique identifier (OID) of the server-side object and at least one interface identifier (IID) defined according to contents of a provision service for client, and the second identifier includes a unique identifier (OID) of the equipment-side object and at least one interface identifier (IID) defined according to a function of the equipment. In addition, the correspondence relation between a combination of the unique identifier and the at least one interface identifier of the first identifier and a combination of the unique identifier and the at least one interface identifier of the second identifier is set in the identifier setting portion. In this case, by increasing the number of the interface identifier of the second identifier assigned to the equipment-side object, it is possible to provide a service by executing plural functions of a specific equipment. In addition, by increasing the number of the interface identifier of the first identifier assigned to the server-side object, it becomes possible to increase the number of a provision service for client provided to the client terminal device with no change of the equipments.

In addition, when the equipment comprises a plurality of equipments having equipment-side objects with different second identifiers, it is preferred that the correspondence relation between the first identifier and the second identifiers is set in the identifier setting portion such that the server performs execution requests of the equipment-side objects to the equipments by use of the different second identifiers according to the execution request of the server-side object using the first identifier from the client terminal device. In this case, the plural equipments can be controlled according to the execution request of a single server-side object from the client terminal device. For example, different kinds of the equipments can be controlled at a time.

In addition when the equipment comprises an equipment having equipment-side objects with different second identifiers, it is preferred that the correspondence relation between the first identifier and the second identifiers is set in the identifier setting portion such that the server performs execution requests of the equipment-side objects to the equipment by use of the different second identifiers according to the execution request of the server-side object using the first identifier from the client terminal device. In this case, according to the execution request of a single server-side object from the client terminal device, execution requests of plural equipment-side objects can be simultaneously performed to the single equipment.

In the case of remote monitoring the equipment(s) by the above network system, it is preferred that the server further comprises a data receiving portion configured to acquire, from the equipment, data obtained when the equipment has executed the equipment-side object, and a service providing portion configured to send a provision service for client to the client terminal device according to the data acquired by the data receiving portion.

In addition, it is preferred that the server receives the data obtained when the equipment has executed the equipment-side object according to the execution request of the server-side object from the client terminal device, then converts the received data into the provision service for client, which is defined according to the server-side object, and sends the provision service to the client terminal device.

It is further preferred that the service providing portion deletes undesired data from the data acquired by the data receiving portion according to a predetermined condition, and then sends it as the provision service for client to the client terminal device. By reducing the data provided to the client terminal device, it is possible to provide the information matched with the client's desired service.

In addition, it is preferred that the first identifier includes a unique identifier of the server-side object, and at least one interface identifier defined according to contents of a provision service for client, and the server increases or decreases the number of the interface identifier in the correspondence relation between the first identifier and the second identifier according to contents requested by the client terminal device. In this case, by increasing or decreasing the number of the interface identifier of the first identifier assigned to the server-side object, it is possible to cope with an increase or decrease in the provision service for client sent from the server to the client terminal device with no change at the equipment side. In brief, the number of an input/output definition function (interface identifier) of the object defining the information of the provision service for client is changed to increase or decrease the provision service for client.

Moreover, it is preferred that the first identifier includes a unique identifier of the server-side object and an interface identifier defined according to contents of a provision service for client, and the server increases or decreases the number of definition of the provision service for client of the interface identifier according to contents requested by the client terminal device. In this case, as described above, it is possible to cope with the increase or decrease of the provision service for client sent from the server to the client terminal device with no change at the equipment side. In brief, the number of information of the provision service for client defined by the input/output definition function (interface identifier) of the server-side object is changed to increase or decrease the provision service for client.

As a preferred embodiment of the network system suitable for remote controlling of an equipment, the equipment comprises a function portion configured to execute processing for providing a service of the equipment, and an information processing portion configured to give to and receive from the function portion the information defined in the equipment-side object and needed to provide the service. The server comprises a service provision function portion configured to receive the execution request of the server-side object using the first identifier from the client terminal device, and a service request function portion configured to perform the execution request of the equipment-side object using the second identifier to the equipment via the network, and give to and receive from the equipment the information corresponding to the service. The client terminal device has a client function portion configured to receive from the service request function portion a provision service for client, which is prepared by use of the information.

As the information defined in the object described above, it is possible to use a variable showing a current status of the function portion, which is sent back to the server when the equipment-side object is accessed by a request of the server, event information, which is sent to the server when a status change of the function portion occurs in a case where the equipment-side object is previously accessed by the server, or an operation instruction function for service provision, which is given from the information processing portion to the function portion when the equipment-side object is accessed from the server.

In the above network system, it is preferred that the service provision function portion has a definition needed to convert information corresponding to the service into the provision service for client, and the service request function portion prepares the provision service for client by use of the information corresponding to the service acquired from the equipment and the definition of the service provision function portion. In brief, a conversion between the information of the service requested to the equipment and the information used for the provision service for client is performed according to the definition of the information used for the provision service for client. In this case, it is possible to add another provision service for client by only changing an application of the client terminal device and the server-side object with not change at the equipment side.

The network system according to a preferred embodiment of the present invention can be defined as follows. That is, this network system comprises at least one equipment, at least one client terminal device, and a server configured such that when the server receives a request of a service provided by the equipment from the client terminal device, the server performs an execution request of the service to the equipment according to the received request, and then provides a corresponding service to the client terminal device according to the service executed by the equipment. To construct the network system, the equipment, the client terminal device and the server are connected to each other via a network. The equipment comprises a function portion configured to execute processing for a provision service of the equipment, and an information processing portion having an object, to which an object identifier is assigned, for defining information used for the provision service, and giving to/receiving from the function portion the information according to the definition. The server comprises a service request function portion configured to perform an execution request of the object as a service request to the equipment via the network by using the object identifier of the object of the information processing portion of the equipment, and give to/receive from the equipment the information corresponding to the requested service, and a service provision function portion configured to have an object, to which a server object identifier is assigned, for giving to/receiving from the service request function portion the information of the requested service, and execute the object when the execution request of the object is received from the client terminal device by use of the server object identifier. The client terminal device has a client function for performing a request of executing the object with use of the server object identifier of the service provision function portion of the server as the service request to the server via the network, and receiving the provision service for client from the server according to the information obtained by executing the object. The service provision function portion of the server increases or decreases the number of the information of the provision service for client in response to an increase or decrease of the provision service for client.

According to the above-mentioned network system, the increase or decrease of the provision service for client provided to the client terminal device can be achieved with no change of the equipments by changing the number of the information of the provision service for client at the service provision function portion of the server.

The network system according to a preferred embodiment of the present invention can be also defined as follows. That is, this network system comprises at least one equipment, at least one client terminal device, and a server provided to give and receive information between the equipment and the client terminal device. The equipment, the client terminal device and the server are connected to each other via a network. The equipment comprises a function portion as a target to be controlled, and an information processing portion having at least one equipment-side object for defining control information, and executing processing for giving the control information to the function portion according to the definition. When an execution request of the equipment-side object is performed from the server by use of an identifier assigned to the equipment-side object, the information processing portion gives the control information to the function portion by executing the equipment-side object. The server has a server-side object associated with the identifier of the equipment-side object. When an execution request of the sever-side object is performed from the client terminal device, a service function portion of the server performs the execution request of the equipment-side object to the equipment via the network by use of the associated identifier. The client terminal device has functions for performing the execution request of the server-side object by use of an identifier assigned to the server-side object, and processing the information provided from the server. The service function portion of the server increases or decreases the number of the equipment-side object associated with the server-side object according to an increase or decrease in service of the equipment operated by the execution request of the server-side object from the client terminal device.

According to the network system of this preferred embodiment, when the client terminal device performs one execution request of the server-side object of the server, execution requests of plural equipment-side objects associated with the server-side object can be performed. Therefore, it is possible to simultaneously provide plural services obtained by executing the equipment-side objects without changing communication traffic between the client terminal device and the server. In addition, even when the services are simultaneously provided from the plural equipments, it is not necessary to make a correspondence with the plural equipment-side objects in the application of the client terminal device. Furthermore, it is possible to flexibly cope with increasing the number of the equipments for providing the services.

Further characteristics of the present invention and advantages brought thereby will be clearly understood from the best mode for carrying out the invention described below.

BEST MODE FOR CARRYING OUT THE INVENTION

The network system of the present invention is explained below in detail according to preferred embodiments. That is, a network system of the present invention for remote monitoring of equipments is explained in a first embodiment, and a network system of the present invention for remote controlling of the equipments is explained in each of second and third embodiments.

(First Embodiment)

Figure 1A:
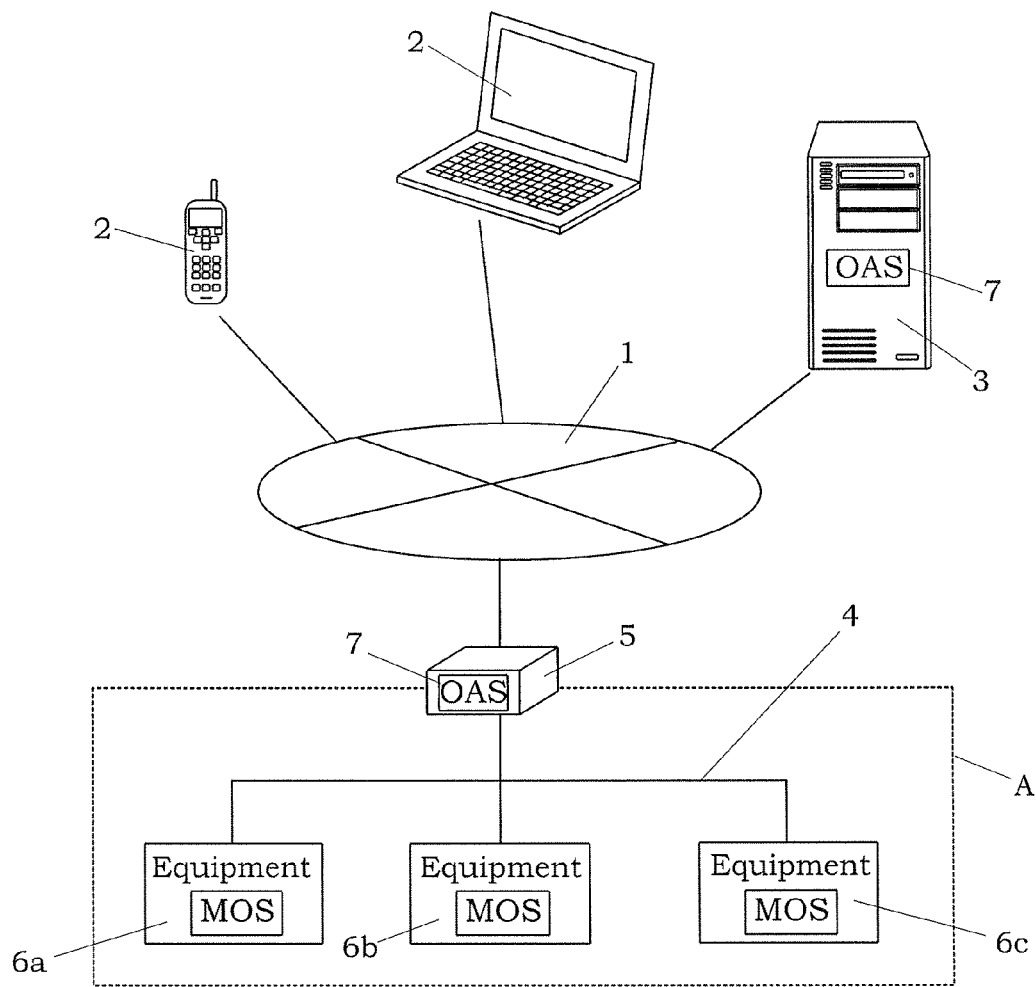
FIG. 1A is a schematic diagram of a network system according to a first embodiment of the present invention.

FIG. 1A shows a schematic configuration of a network system of the present embodiment. This network system is mainly composed of a client terminal device 2 such as a personal computer connected to the Internet 1 that is an open network, or a mobile communication terminal device used in a mobile communication network connected to the Internet 1, a center server 3 having functions of an object access server 7 (hereinafter referred to as "OAS") connected to the Internet 1, as described later, a gateway 5 connected between a local area network (LAN) 4 in a user area A and the Internet 1, and having the functions of the above-described OAS 7 including a protocol converting function between the Internet 1 and the LAN 4, and various kinds of equipments 6 (three equipments 6a-6c are shown in the attached drawing) connected by the LAN 4 and placed at houses or buildings in the user area A.

Figure 2A:
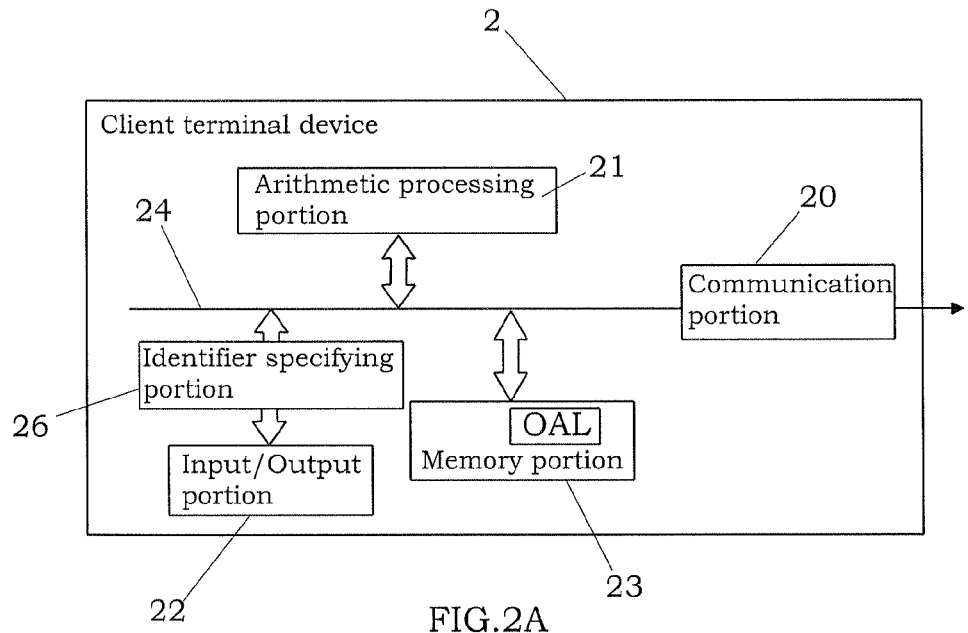
FIG. 2A is a schematic diagram of a client terminal device used in the network system.

As shown in FIG. 2A, the client terminal device 2 is provided with a communication portion 20 for network communication, an arithmetic processing portion 21, an input/output portion 22 such as a keyboard or a display, and a memory portion 23 used to temporarily store data, and install a client software (Object Access Library, hereinafter referred to as "OAL") for receiving services provided in the network system and a client application (software). In the arithmetic processing portion 21, node discovery is performed on the Internet 1 and the LAN 4 by executing the OAL. In addition, the arithmetic processing portion 21 can access an object described later. By executing the client application, the client terminal device 2 can receive a provision service for client of the OAS 7 mounted on the center server 3 in a desired form. In FIG. 2A, the reference numeral 24 designates a bus. Moreover, the client terminal device 2 has an identifier specifying portion 26 configured to individually specify identifiers described later. According to information for a service request input through the input/output portion 22, a prescribed identifier is specified.

Figure 2B:
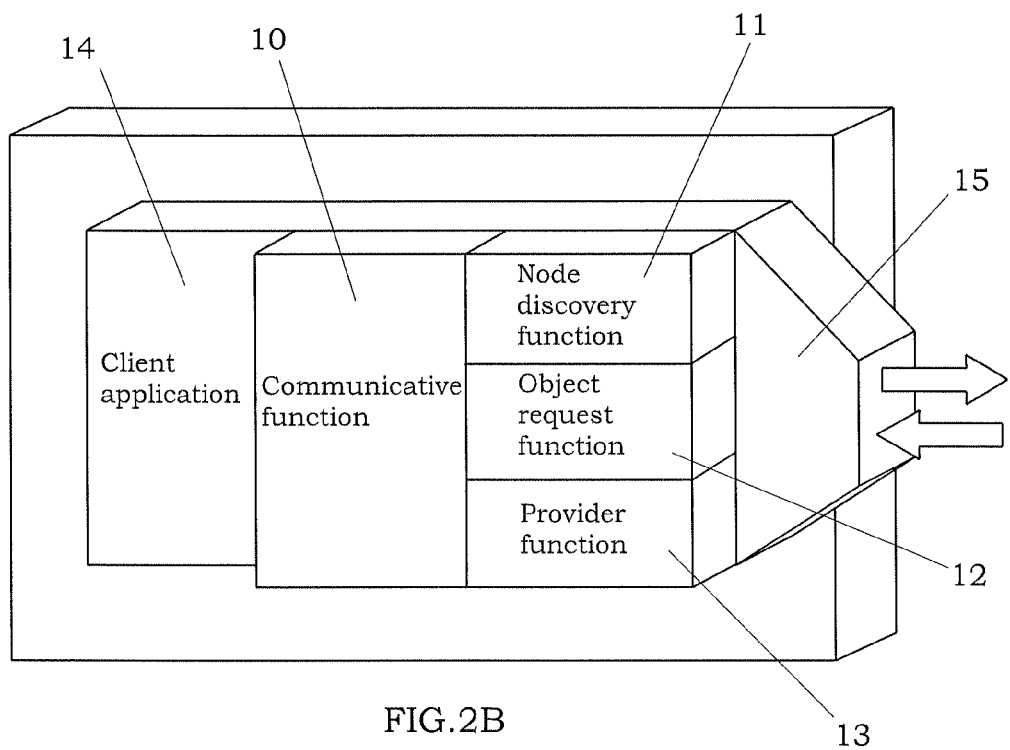
FIG. 2B is a configuration diagram of a client platform of the client terminal device.

In this embodiment, a client platform including the client application and the OAL has a configuration shown in FIG. 2B. That is, the OAL comprises a communicative function 10 for giving and receiving information with a client application 14, a node discovery function 11 for detecting the equipments installing objects on the network, an object request function 12, a provider function 13 for network connection, and transmission conditions 15 for OAL platform.

On the other hand, the equipments 6 (6a to 6c) connected to the network system can be placed at houses or buildings in the user area A. As the equipments placed at the buildings, there are environmental equipments such as lighting and air conditioning equipments, crime-prevention equipments, disaster-prevention equipments, and sensor devices used in these equipments such as temperature sensor, brightness sensor, motion sensor, and fire detection sensor. These equipments and devices can be placed at the houses.

Figure 3A:
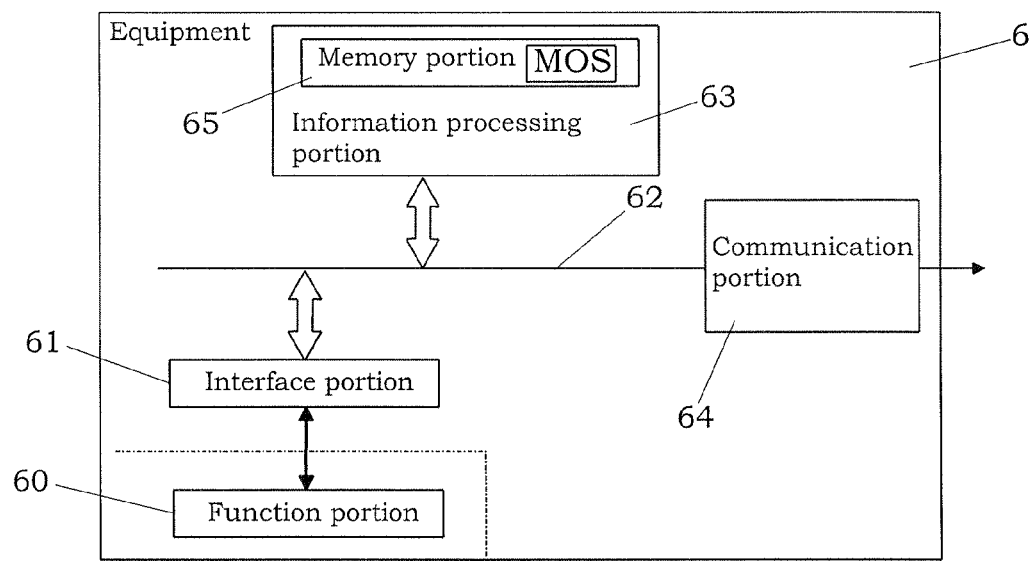
FIG. 3A is a schematic diagram of an equipment used in the network system.

As shown in FIG. 3A, each of these equipments 6 is basically composed of a function portion 60 for providing a service peculiar to the equipment 6, an information processing portion 63, and a communication portion 64 for network communication, and a memory portion 65 provided in the information processing portion 63. For example, when the equipment is an air conditioning equipment, the function portion 60 corresponds to an air conditioning means and a controller therefor. Alternatively, when the equipment is a lighting equipment, the function portion 60 corresponds to a lighting means for controlling lighting and brightness of lighting loads. In various types of sensor devices, the function portion 60 corresponds to a header for detection and a signal processing portion for outputting detection information detected by the header. The information processing portion 63 is configured to give a function for operation instruction (operation control) to the function portion 60 through an interface portion 61 and a bus 62, acquire a variable showing a current status of the function portion 60, or acquire event info illation showing the occurrence of a status change of the function portion 60. In the memory portion 65A, a software module (hereinafter referred to as "MOS"<Micro Object Server>) is installed to achieve an object server function in the network system of this embodiment.

Figure 3B:
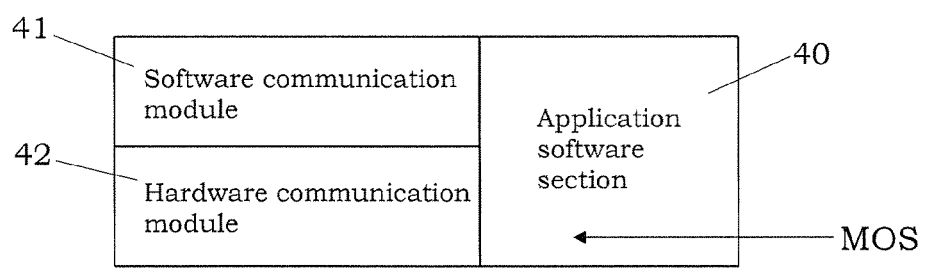
FIG. 3B is a configuration diagram of a MOS mounted in the equipment.

As shown in FIG. 3B, this MOS is composed of an application software section 40 including an object that is a program module for providing a service, a software communication module 41 corresponding to OSI 7-layer protocol described later, and a hardware communication module 42 configured to communicate with the communication portion 64 and the interface portion 61.

The above-described OAS 7 installed in the gateway 5 and the center server 3 has a software for achieving an object router function for hiding network connection, various kinds of application softwares, which are executed to allow the user (the client terminal device 2) to receive the service provided by the function portion 60 of the equipment 6 by accessing an input/output definition function (hereinafter referred to as "interface") under the object of the equipment 6, and softwares for achieving additional service functions such as a protocol bridge service for enabling a seamless connection to the network system of the present embodiment through a protocol conversion, and a firewall bridge service for converting the protocol between the OAS-7 into SOAP (Simple Object Access Protocol) to pass through the firewall.

As the protocol for the network system of the present embodiment, an OSI 7-layer model is used. In addition, as an application layer of the uppermost layer, a unique object access protocol (=OAP) is used to give and receive the information such as the variable, the event information and the function between the client terminal device 2 and the MOS of the information processing portion 63 of the equipment 6.

The software communication module 41 of the MOS is responsible for the protocol of from a network layer to a presentation layer of the OSI 7-layer model to perform the consolidation of TCPUDP and the definition of the above-mentioned OAP.

Each of the equipments 6 has at least one object, which is used when the function portion 60 executes processing for service provision, in the MOS of the information processing portion 63. In addition, the object has at least one interface defined by the information (variable, function, event information or a combination thereof) corresponding to the provision service. A unique identifier (hereinafter referred to as "OID") is assigned to the object, and an interface identifier (or an input/output definition identifier, which is hereinafter referred to as "IID") is assigned to the interface. An interface having a same definition content, i.e., the interface having a same IID can be assigned under a plurality of objects. In a service where it is not needed to specify a specific equipment 6, a same OID can be assigned to objects of plural equipments 6.

In the case of accessing the interface of a specific object of the equipment 6, a service request of the client terminal device 2 is performed to the equipment 6 through the center server 30 and the gateway 5. To identify the equipment 6 on the Internet communication, a local IP address managed by a router function of the gateway 5 is used. Therefore, each of the equipments 6 has the local IP address.

The OAS 7 of the gateway 5 has a protocol conversion function and a routing function. The routing function is provided by a software in a CPU portion (not shown) of the gateway 5. The routing function comprises preparing a routing table (a connected equipment identification table) showing a relation between the IP address of the equipment 6 (6a, 6b, 6c) and combination information of the IID of the interface and the OID of the object in the MOS of the equipment 6 connected to the LAN 4, and executing routing processing. That is, at the time of initial activation, the equipments 6 (6a, 6b, 6c) connected to the network are read out by means of multicasting with the OAP, and node discovery is performed according to the presence or absence of response to acquire the IP address. Subsequently, the above-described routing table is prepared by use of the IP address and the combination information of the IID of the interface and the OID of the object of the MOS provided from each of the equipments (6a, 6b, 6c). In addition, the combination information of the OID of the object and the IID of the interface is sent to a server on the Internet 1. In the case of FIG. 1A, the combination information is sent to the center server 3.

Figure 1B:
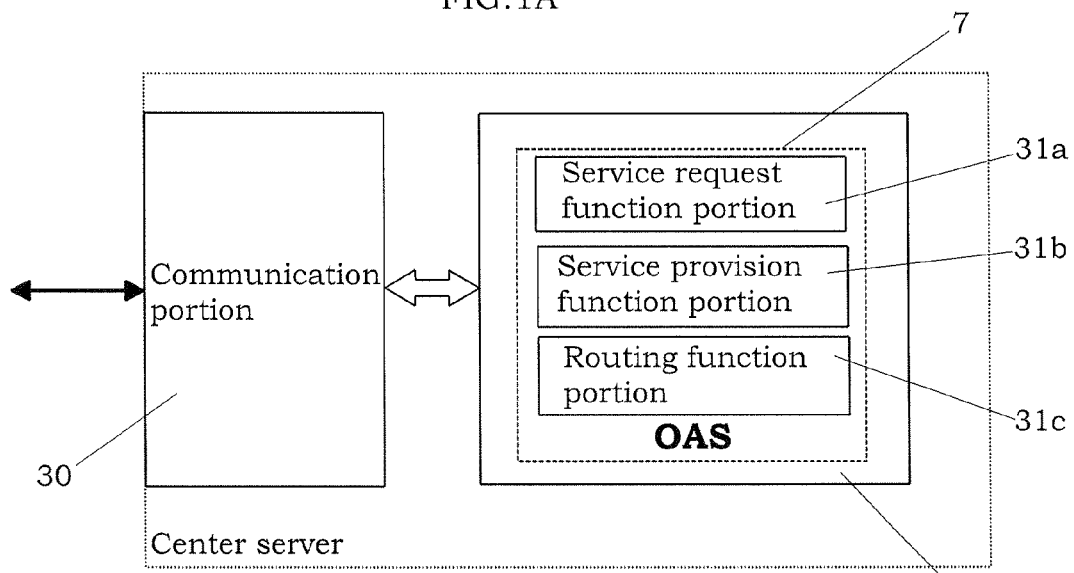
FIG. 1B is a configuration diagram of a center server used in the network system.

On the other hand, as shown in FIG. 1B, the center server 3 is formed by a computer system comprising a communication portion 30 for network communication and an arithmetic processing portion 31 for realizing the OAS 7 by a software. The OAS 7 of the center server 3 has a routing function portion 31c, a service request function portion 31a and a service provision function portion 31b. The routing function portion 31c prepares a routing table (a connected OAS identification table) showing a relation between the IP address of the gateway 5 and the combination information of IID and OID provided from the gateway 5, and executes routing processing. The service request function portion 31a executes, as a service request, a request of giving and receiving the information defined by the interface of the object to the equipment 6 through the gateway 5 by use of the OID of the object for the MOS of the information processing portion 63 of the equipment 6, the IID of the interface under the object, or the combination information of the OID and the IID. In addition, the service request function portion 31a also executes giving and receiving the information corresponding to the requested service with the equipment 6 through the gateway 5. The service provision function portion 31b has an interface, which defines information used to a provision service for client, and executes giving and receiving the information of the requested service with the service request function portion 31a according to the definition of the interface. In addition, the service provision function portion 31b has an object for executing a conversion between the information of the requested service and the information used to the provision service for client according to the definition. An OID is assigned to the object, and an IID is assigned to the interface under the object. When the service provision function portion 31b receives from the client terminal device 2 a request of executing the object with use of the unique identifier (OID) of the object, the IID of the interface under the object, or a combination of the OID and the IID, the service provision function portion 31b executes the object. By using the node discovery function 11, the combination information of the OID of the object and the IID is given through the Internet 1 to the client terminal device 2 connected to the OAS 7 of the center server 3.

Figure 4A:
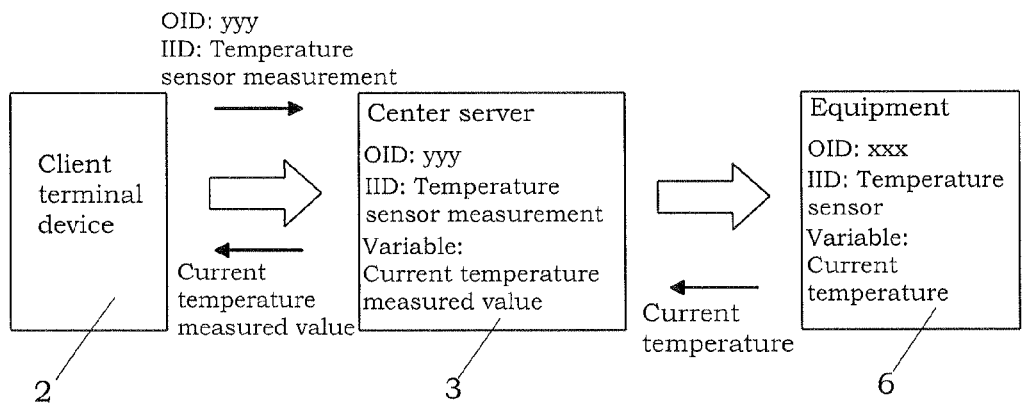
FIGS. 4A to 4C are explanatory diagrams showing operation examples of the network system.

Next, under the condition that the routing tables of the OAS 7 of the gateway 5 and the center server 3 are already prepared according to the above procedures, and the equipments 6, the center server 3, and the client terminal device 2 are in working state, an operation of the network system of the present embodiment is explained referring to FIG. 4A.

In this explanation, the function portion 60 of the equipment 6 in the working state is a temperature sensor. The information handled as a provision service of the function portion 60 by the interface with the IID "temperature sensor" is defined as a variable with the name of "current temperature". The information processing portion 63 executes receiving this variable from the function portion 60, and has an object, to which the OID "xxx" is assigned.

On the other hand, in the service provision function portion 31b of the OAS 31 of the center server 3, the information handled as a provision service for client by the interface with the IID "temperature sensor measurement" is defined as a variable with the name of "current temperature measured value". When the center server is accessed by a service request from the client terminal device 2, the service request is performed by use of the OID "xxx" assigned to the object of an associated equipment(s) 6 on the network and the IID "temperature sensor" of the interface under the object. As a result of this service request, the service request function portion 31a functions to acquire the variable "current temperature" provided from the associated equipment(s) 6. In addition, the service provision function portion 31b has an object programmed as the provision service for client such that the variable "current temperature" acquired by the service request function portion 31a is sent to the client terminal device 2, which has performed the service request.

In association with the provision service for client, the OAL of the client terminal device 2 has an application programmed to perform a service request to the center server 3 by use of the OID "yyy" and the IID "temperature sensor measurement", and record the variable "current temperature measured value" provided from the center server 3 as a result of the service request.

In the above-described network system composed of the equipments 6, the center server 3, and the client terminal device 2, when the client terminal device 2 performs the service request to the OAS 7 of the center server 3 by use of the OID "yyy" and the IID "temperature sensor measurement", the service provision function portion 31b of the OAS 7 executes a predetermined object, and the service request function portion 31a periodically performs the service request to the associated equipment(s) 6 by use of the OID "xxx" and the IID "temperature sensor". According to this service request, when the service request function portion 31a acquires the variable "current temperature" from the equipment(s) 6, the variable "current temperature" is converted into the variable "current temperature measured value" at every acquisition of the variable, and then sent as the provision service for client to the client terminal device 2.

When the client terminal device 2 receives the variable "current temperature measured value" as the provision service for client, it is recorded in a memory portion (not shown). Thus, when the client (user) performs the service request to the center server 3, it becomes possible to get the detected temperature history from the recorded data as well as the current temperature detected by the temperature sensor that is the function portion 60 of the equipment 6.

By the way, when a service of recording average temperature for 5 minutes is added as a new provision service for client in addition to the current temperature, or another service is added according to the client's needs, it is possible to cope with such a case by adding an expanded program corresponding to the new service into the application of the OAL of the client terminal device 2, and combining information corresponding to the new provision service for client with the information defined by the interface of the object in the service provision function portion 31b of the OAS 7 of the center server 3, or adding an interface defining the information corresponding to the new provision service for client. In brief, no change is needed at the equipment side.

The relation between the combination information of the OID and the IID of the server-side object and the combination information of the OID and the IID of the equipment-side object is set in a table form by a correspondence relation setting function (identifier setting portion) of the OAS 7 of the center server 3. The above-described execution request is performed referring to the table prepared by this correspondence relation setting function.

Next, an operation of adding a service is explained in detail according to the following examples.

EXAMPLE 1

In this example, it is explained about a case of adding information defining a new provision service for client to the interface of the current object. As the information defined by the interface of the current object with the OID "yyy" in the service provision function portion 31b of the OAS 7 of the center server 3, a variable with the name of "average temperature for 5 minutes" corresponding to the new service is used in addition to the variable "current temperature measured value". In addition, a program corresponding to the new provision service for client is added to the object. This program is programmed such that the variable "current temperature" periodically acquired from the equipment(s) 6 is temporarily recorded to calculate an average value for 5 minutes, and then the calculated average value is sent as the variable "average temperature for 5 minutes" to the client terminal device 2.

On the other hand, in the OAL of the client terminal device 2, an expanded program for recording the variable "average temperature for 5 minutes" is added to the application programmed to perform a service request to the center server 3 by use of the current OID "yyy" and the IID "temperature sensor measurement", and record the variable (data) "current temperature measured value" provided from the center server 3 as a result of the service request.

Figure 4B:
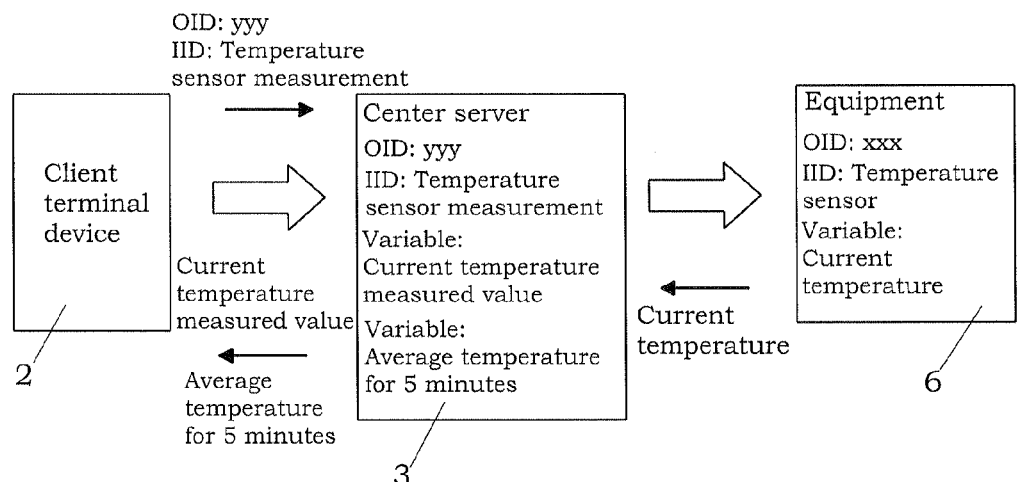

As in the case described above, when the client terminal device 2 performs the service request to the OAS 7 of the center server 3 by use of the OID "yyy" and the IID "temperature sensor measurement", as shown in FIG. 4B, the service provision function portion 31b of the OAS 7 executes the predetermined object. On the other hand, the service request function portion 31a periodically performs a service request to the associated equipment(s) 6 by use of the OID "xxx" and the IID "temperature sensor". When the service request function portion 31a receives the variable "current temperature" from the equipment(s) 6 as a result of this service request, a processing of converting the variable "current temperature" into the variable "current temperature measured value", and sending the converted variable as the provision service for client to the client terminal device 2 is performed at every acquisition of the variable. Furthermore, a processing of recording the variable "current temperature" over 5 minutes, calculating the average value of the recorded "current temperature", and then sending the calculation result, i.e., the variable "average temperature for 5 minutes" as the provision service for client to the client terminal device 2 is performed every 5 minutes.

In the client terminal device 2, these variables "average temperature for 5 minutes" and "current temperature measured value" are received and stored in the memory portion (not shown). Thus, the client (the user) can get the current temperature detected by the temperature sensor that is the function portion 60 of the equipment 6, the detected temperature history, and the average value calculated every 5 minutes.

EXAMPLE 2

In the present example, it is explained about a case of adding an interface (interface identifier) defining information corresponding to a new provision service for client to the current interface of the object.

In the object with the OID "yyy" of the service provision function portion 31b of the OAS 7 of the center server 3, an interface with the IID "temperature sensor average value calculation", which defines a variable with the name of "average temperature for 5 minutes", is used for the new provision service for client in addition to the interface with the IID "temperature sensor measurement" corresponding to the variable "current temperature measured value". In addition, a program corresponding to the new provision service for client is added for the new object. This program is programmed to temporarily record the variable "current temperature" periodically acquired from the equipment(s) 6, calculate the average value for 5 minutes, and then send the calculated average value as the variable "average temperature for 5 minutes" (the provision service for client) to the client terminal device 2.

On the other hand, in the OAL of the client terminal device 2, a function of performing a service request to the center server 3 by use of the OID "yyy" and the IID "temperature sensor average value calculation" is added to the function of performing the service request to the center server 3 by use of the current OID "yyy" and the IID "temperature sensor measurement". In addition, an expanded program of recording the variable "average temperature for 5 minutes" is added to the application programmed to record the variable "current temperature measured value" provided from the center server 3 as a result of the service request.

As in the case described above, when the client terminal device 2 performs the service request to the OAS 7 of the center server 3 by use of the OID "yyy" and the IID "temperature sensor measurement", the service provision function portion 31b of the OAS 7 executes the predetermined object. On the other hand, the service request function portion 31a periodically performs a service request to the associated equipment(s) 6 by use of the OID "xxx" and the IID "temperature sensor". When the service request function portion 31a receives the variable "current temperature" from the equipment(s) 6 as a result of this service request, a processing of converting the variable "current temperature" into the variable "current temperature measured value" at every acquisition of the variable, and sending the converted variable as the provision service for client to the client terminal device 2 is performed.

Figure 4C:
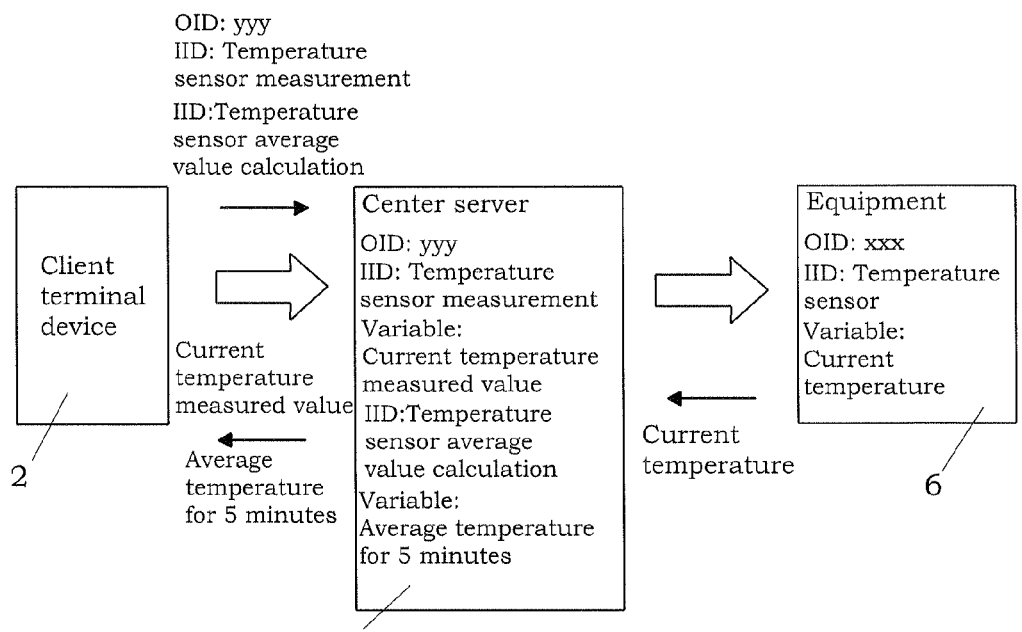

In addition, as shown in FIG. 4C, when the client terminal device 2 performs the service request to the OAS 7 of the center server 3 by use of the OID "yyy" and the IID "temperature sensor average value calculation", the service provision function portion 31b of the OAS 7 executes the predetermined object. The variable "current temperature" is recorded over 5 minutes from the execution, and then the average value is calculated. This calculation result, i.e., the variable "average temperature for 5 minutes" is sent as the provision service for client to the client terminal device 2.

In the client terminal device 2, these variables "average temperature for 5 minutes" and "current temperature measured value" are received and stored in the memory portion (not shown). Thus, the client (the user) can get the current temperature detected by the temperature sensor that is the function portion 60 of the equipment 6, the detected temperature history, and the average value calculated every 5 minutes.

In the above examples 1 and 2, the information defined by the interface is the variable. Alternatively, when controlling the function portion 60 of the equipment 6 as the provision service, a function can be used. In addition, when detecting the occurrence of an event as the provision service, event information can be used. In response to the contents of the provision service, an optional combination of the function, the variable and the event information may be used.

In addition, in the above examples 1 and 2, it was explained about the cases of adding the provision service for client. On the contrary, the provision service can be reduced by decreasing the number of definition information or the number of the interface. Moreover, when the center server 3 accesses the interface defining the same information under the objects of the plural equipments 6, it is possible to receive the same provision service from the equipments 6 by accessing with use of only the IID of the interface without using the OID of the object. Furthermore, when accessing with use of only the OID of the object, it is possible to receive the services corresponding to the information defined by all of the interfaces under the object.

In addition, when the equipment 6 becomes old, and the service provided thereby is not needed, the OAS 7 may have an application programmed to stop the service provision to the client terminal device 2 even when the object of the OAS 7 of the center server 3 is accessed from the client terminal device 2, and the OAS 7 of the center server 3 receives execution results from the equipment(s).

(Second Embodiment)

Figure 5:
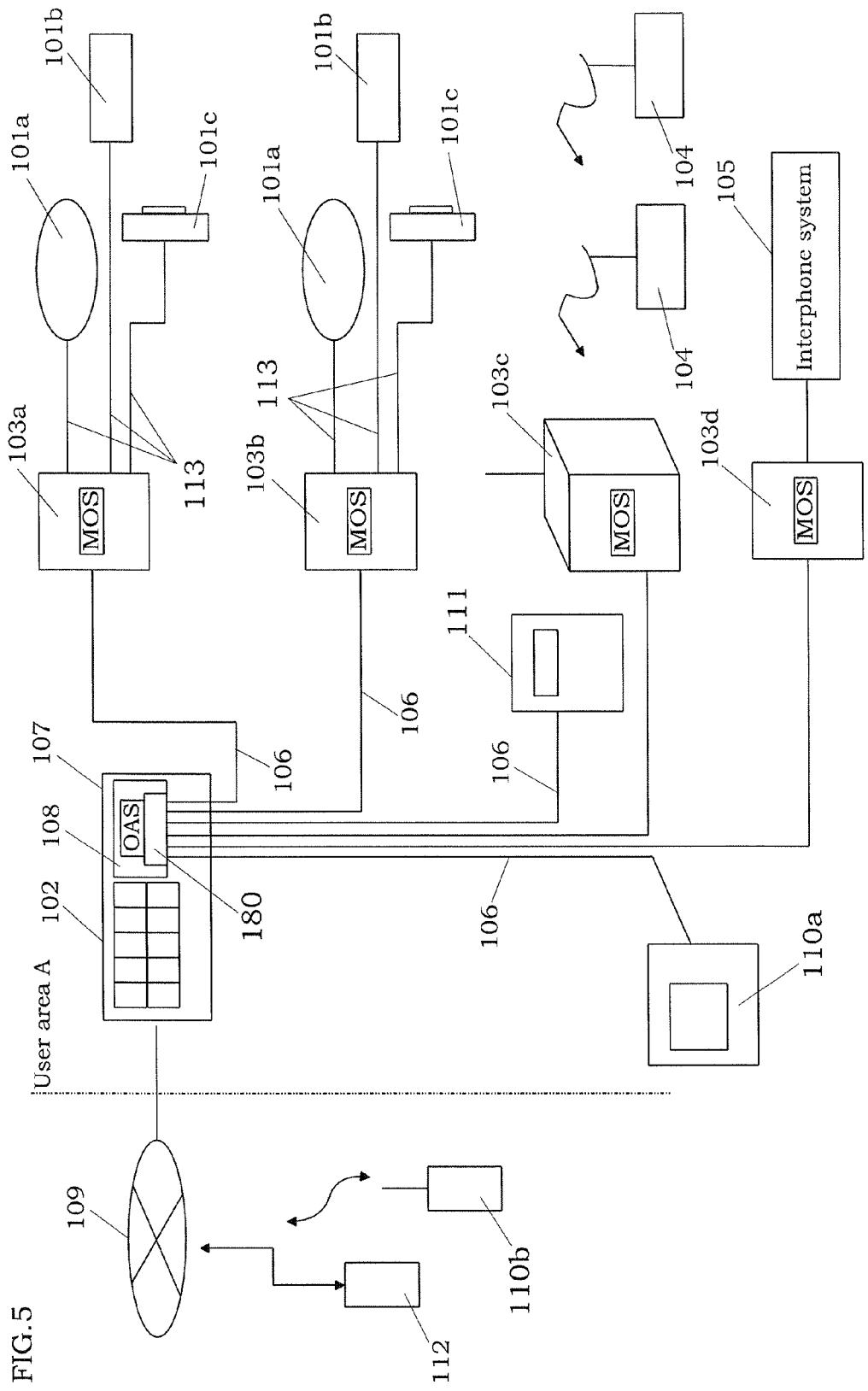
FIG. 5 is a schematic diagram of a network system according to a second embodiment of the present invention.
Figure 7:
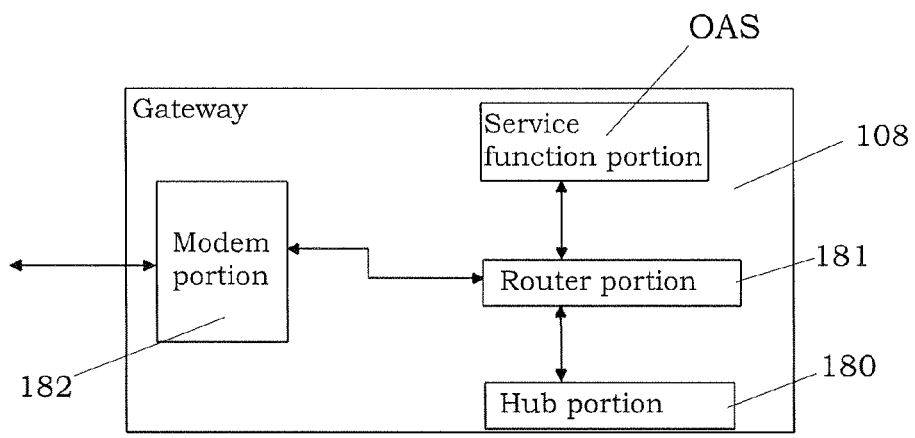
FIG. 7 is a configuration diagram of a gateway used in the network system of the second embodiment.

In the present embodiment, as shown in FIG. 5, a remote control system of equipments is realized in a house, i.e., the user area A by use of the network system of the present invention. Each of the equipments 103 is connected to a LAN cable 106 installed in the house. The equipments 103 comprises integrated controllers (103a, 103b) for remote controlling electric appliances 101, which meet the JEMA standards (The Japan Electrical Manufacturer's Association), such as a lighting apparatus 101a, an air conditioning device 101b and electrical locking device 101c, an alarm monitoring device 103c, and a recorded-image transfer device 103d. The alarm monitoring device 103c monitors the state of a sensor 104 for detecting unusual events such as crime-prevention/disaster-prevention sensors through wireless communication, and outputs alarm information when the occurrence of unusual events is detected. The recorded-image transfer device 103d sends a recorded image of visitors taken by a television camera (not shown) of an interphone system 105 to a monitor disposed outside or inside of the house. The LAN 106 is connected to a hub portion 180 of a gateway 108, as shown in FIG. 7. The gateway 108 also functions as a server. That is, the gateway 108 has a service function portion (OAS) that is an object access server described later. This OAS is provided in a distribution board 107 having breakers 102 for household use such as main and branch circuit breakers therein. The gateway 108 is also connected to the Internet 109 through a router portion 181 and a modem portion 182 for the Internet connection network provided by a connection service provider such as ADSL or optical fiber communication network.

A dedicated client terminal device 110a and a personal computer 111 are connected to the hub portion 180 of the gateway 108 though the LAN 106. On the other hand, a center server 112 and another client terminal device 110b such as a mobile phone connectable to the Internet through a mobile communication network are connected to the Internet 109.

Figure 6A:
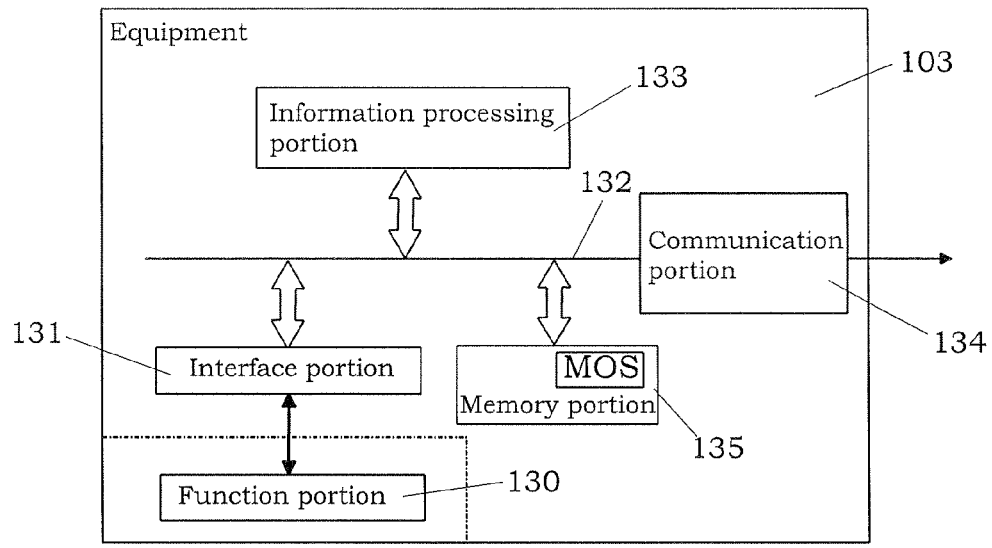
FIG. 6A is a basic configuration diagram of an equipment used in the network system of the second embodiment.

As shown in FIG. 6A, the equipment 103 used in the network system of this embodiment is basically composed of a function portion 130 for providing a service peculiar to the equipment, an information processing portion 133, a communication portion 134 for network communication (e.g., communication meeting the Ethernet (registered trademark) standards) and a memory portion 135. The information processing portion 133 executes processing of giving an operation instruction (operation control) function to the function portion 130 through an interface portion 131 and a bus 132, acquiring a variable showing the current status of the function portion 130, or acquiring event information showing the occurrence of a status change of the function portion 130. A module portion MOS (Micro Object Server) is incorporated in the memory portion 135 to achieve an object function in the remote control system of this embodiment.

Figure 6B:
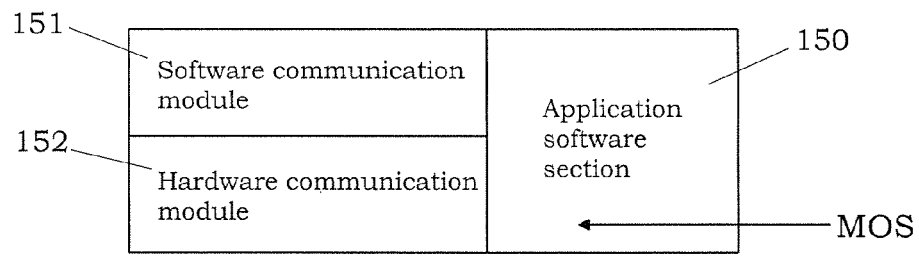
FIG. 6B is a configuration diagram of a MOS mounted in the equipment.

As shown in FIG. 6B, this module portion MOS is formed with an application software section 150 for the equipment 103, a software communication module 151 corresponding to OSI 7-layer protocol described later, and a hardware communication module 152 configured to give and receive information with the function portion 130.

The integrated controller (103a, 103b) that is the equipment mounting the module portion MOS has functions of generating control signals meeting the JEMA standards to the lighting apparatus 101a, the air conditioning device 101b and the electrical locking device 101c through signal lines 113, and receiving operation signals as the monitoring information. In addition, the integrated controller has a function portion configured to give and receive the information corresponding to these signals with the information processing portion 133 as the above-described function portion 130.

The alarm monitoring device 103c that is the equipment mounting the module portion MOS has a wireless receiving portion for wireless receiving a detection signal from the sensor 104 for detecting the occurrence of unusual events, and a function portion configured to receive the detection signal from the wireless receiving portion, and activate an alarm or outputting alarm information to the outside when the occurrence of unusual events is detected. This function portion corresponds to the above-described function portion 130, and gives the alarm information to the information processing portion 133.

In addition, the recorded-image transfer device 103d that is the equipment mounting the module portion MOS has a image recording portion configured to store the recorded image data as the function portion 130. The recorded image data stored in this function portion 130 is given to the information processing portion 133.

As described above, the gateway 108 has the hub portion 180, the router portion 181 and the modem portion 182 for the Internet connection. In addition to these components, the gateway 108 also has a service function portion OAS, which is composed of a software for achieving an object router function for hiding network connection of the equipments 103, various kinds of application softwares, which are executed to allow the user to receive the service provided by the function portion 130 of the equipment 103 by accessing the input/output definition function (i.e., the interface) of an equipment-side object of the respective equipment 103, and softwares for achieving additional service functions such as a protocol bridge service for enabling a seamless connection to the network system of the present embodiment through a protocol conversion, and a firewall bridge service for converting a protocol used to communicate with the center server 112 described later into SOAP (Simple Object Access Protocol) to pass through the firewall.

As the protocol for the remote control system of the present embodiment, an OSI 7-layer model is used. The module portion MOS of the information processing portion 133 of the equipment 103 constructs an application layer according to a unique protocol (hereinafter referred to as "OAP") for providing the variable or the event information to the client terminal device (110a, 110b) or receiving the function. By using this OAP, the information is given and received between the service function portion OAS and the module portion MOS of the equipment 103.

In addition, the software communication module 151 of the module portion MOS is responsible for the protocol of from the network layer to the presentation layer of the OSI 7-layer model to achieve the consolidation of TCP, UDP and the definition of the above-mentioned OAP.

The center server 112 provided on the Internet 109 has a service function portion OAS, as in the case of the gateway 108. The service function portion OAS of the center server can be communicated with the other service function portion by the above-described SOAP.

Each of the equipments 103 used in the present system has at least one equipment-side object used when the function portion 130 executes processing for service provision under the module portion MOS incorporated in the information processing portion 133. The equipment-side object has at least one interface defined by the information corresponding to the provision service (a variable showing the current status of the function portion 130, a function for control given to the function portion 130, or event information showing that a change occurs at the function portion 130). A unique identifier (hereinafter referred to as "OID") is assigned to the respective object, and an interface identifier (hereinafter referred to as "IID") is assigned to the respective interface.

The interface having a same definition content, i.e., the interface having a same IID can be assigned to a plurality of equipment-side objects. The equipment-side object is executed when the information processing portion 133 receives an execution request with the OID of the equipment-side object or the IID of the interface or a combination of the OID and the IID from the service function portion OAS of the gateway 108, as described later. When the execution request is performed to the specific interface under the specific equipment-side object, the combination of the OID and the IID is used. When the interface having the same definition content is provided under equipment-side objects of plural equipments 103, or under plural equipment-side objects of an equipment 103, only the IID of the interface is used to perform the execution request.

On the other hand, the service function portion OAS of the gateway 108 disposed in the house of the user area has at least one server-side object used to execute processing for service provision. The server-side object has at least one interface defined by information (variable, function, event information, or a combination thereof). The service function portion OAS of the gateway 108 has a correspondence relation setting function for setting the correspondence relation between combination information of the OID of the server-side object and the IID of the interface under the object and combination information of the OID of a corresponding equipment-side object and the IID of the interface under the object, and storing the correspondence relation in a correspondence relation setting table. In addition, this server-side object is programmed such that when an execution request with the OID and the IID of the service function portion OAS is sent from the client terminal device 110a or the client terminal device 110b through the center server 112, an execution request to the interface of the specific equipment-side object of the module portion MOS of a previously-associated equipment 103 is performed by use of the OID and the IID.

Figure 8:
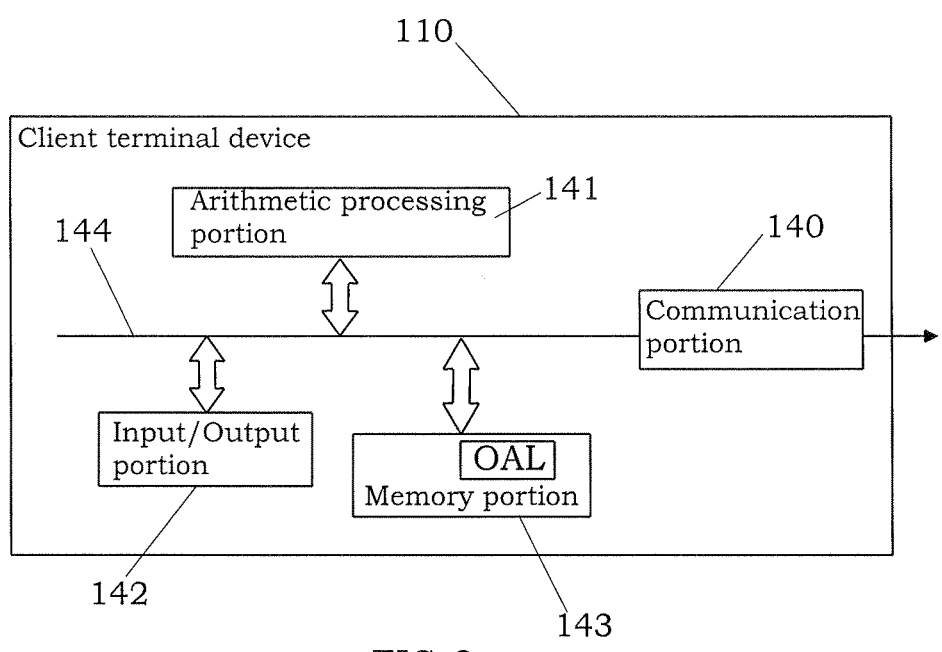
FIG. 8 is a schematic diagram of a client terminal device used in the network system of the second embodiment.

As shown in FIG. 8, the client terminal device 110 (110a, 110b) is formed with a communication portion 140 for realizing network communication, an arithmetic processing portion 141, an input/output portion 142 such as keyboard or display, and a memory portion 143 for installing a client software (hereinafter referred to as "OAL" (Object Access Library)) or a client application, which is used to enjoy the provision service in the network system. The memory portion 143 is also used to temporarily store data. The arithmetic processing portion 141 can perform an execution request to an object described later on the Internet 109 or the LAN 106 by executing the OAL. In addition, by executing the client application, the client terminal device 110 can receive a service provided by the equipment 103, i.e., a control request to the equipment 103 or monitoring information (variable, event information) from the equipment 103, in a desired form. In FIG. 8, the reference numeral 144 designates a bus.

Next, an operation of the network system of the present embodiment is explained. First, when the system is started, the service function portion OAS of the gateway 108 executes processing of detecting the equipments 103 (103a to 103d) having the module portion MOS connected to the LAN 106 to acquire the information for network communication such as IP address of the equipments 103 (103a to 103d) on the LAN 106. After the connection processing is finished, the module portion MOS of each of the equipments 103 (103a to 103d) executes processing of sending all of combination information of the OID of the equipment-side object of its own module portion MOS and the IID of the interface under the object to the service function portion OAS of the gateway 108.

On the other hand, in the service function portion OAS of the gateway 108, the correspondence relation between the combination information of the OID and the IID of the equipment-side object received from each of the equipments 103 (103a to 103d) and the IP address that is an identifier for the network communication (TCP/IP base) of the equipments 103 (103a to 103d) is previously stored in a connected equipment information table. The stored information of the correspondence relation between the combination information and the IP address is updated in response to an increase or decrease in the number of the equipments 103.

In addition, the gateway 108 executes processing of sending the OID of the server-side object of its own service function portion OAS and the IID of the interface to the client terminal device 110a connected to the LAN 106 under the gateway. This processing is executed every time that the combination information of the OID and the IID is updated. In addition, the information of the OID of the equipment-side object of each of the equipments 103 (103a to 103d) and the IID of the interface under the object may be sent from the gateway 108.

The gateway 108 also executes processing of sending the information of the OID of the equipment-side object of each of the equipments 103 (103a to 103d) managed by the gateway 108 and the IID of the interface under the object to a server mounting the service function portion OAS on the Internet 109, e.g., the center server 112 shown in FIG. 5. This processing is executed every time that the combination information of the OID and the IID is updated. In addition, the gateway 108 previously sends the OID of the server-side object of its own service function portion OAS and the IID of the interface to the center server 112.

Figure 9A:
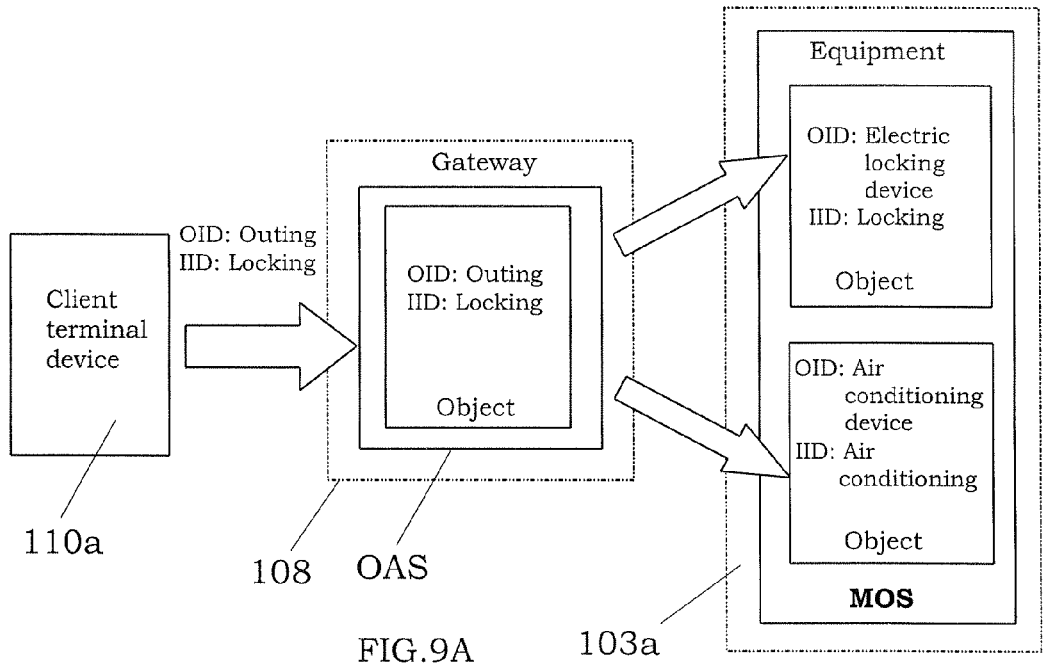
FIGS. 9A and 9B are explanatory views showing operation examples of the network system of the second embodiment.
Figure 9B:
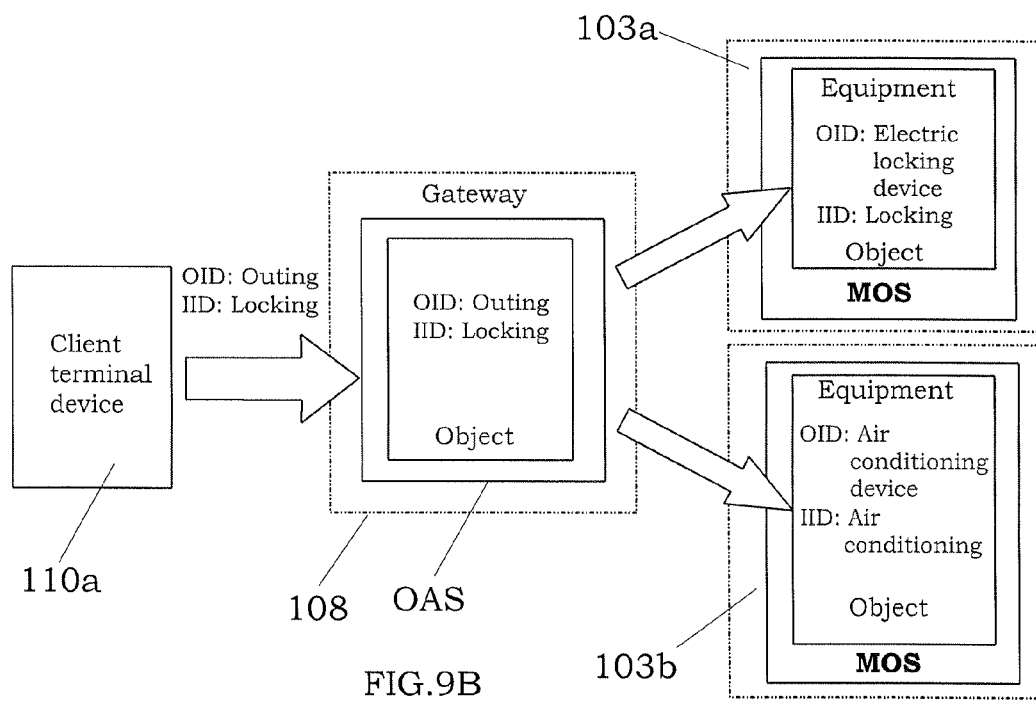
Figure 10:
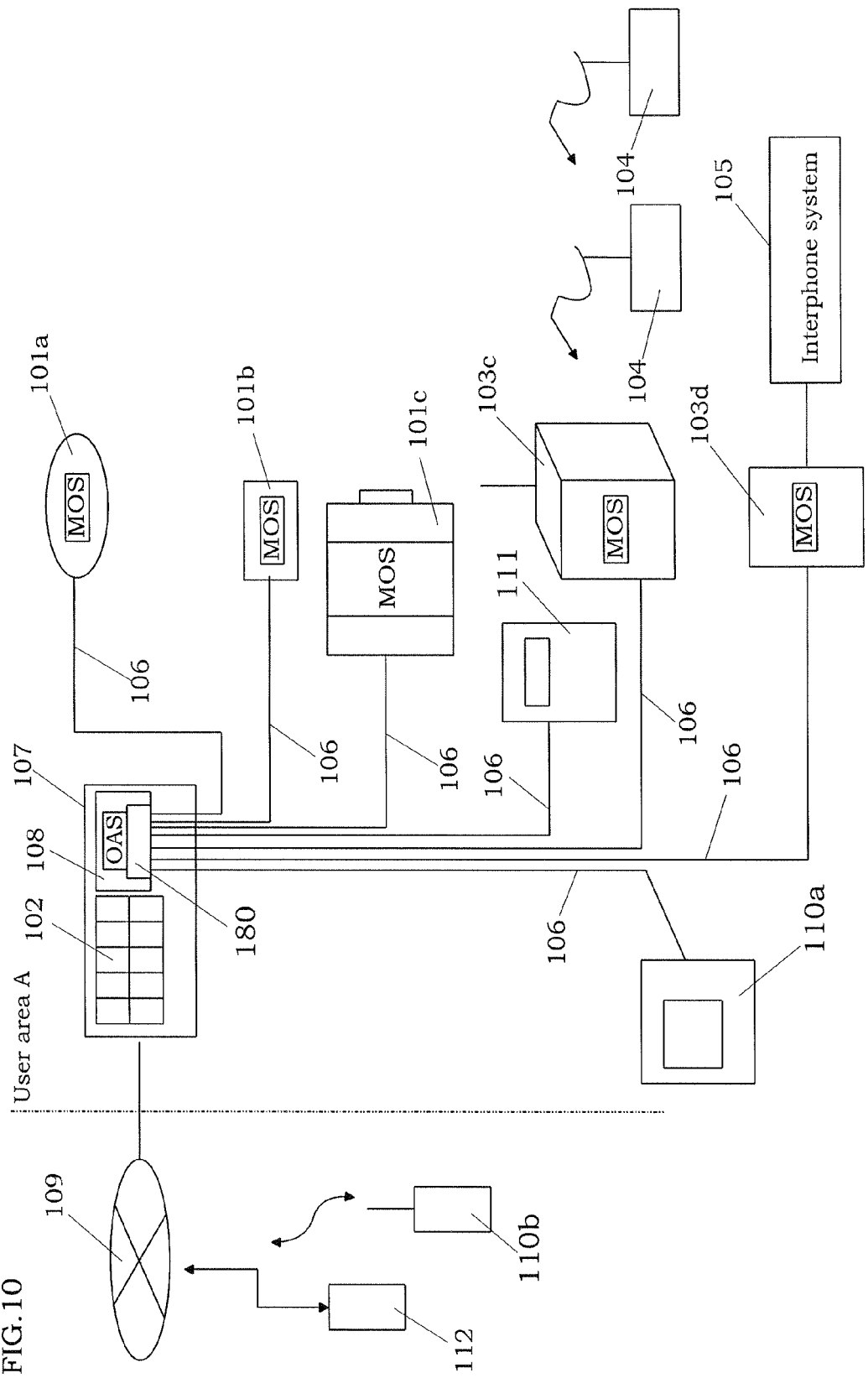
FIG. 10 is a schematic diagram of a network system according to a third embodiment of the present invention.

In the thus constructed system, operations for requesting services of the equipments 103 from the client terminal device (110a or 110b) are concretely explained referring to FIGS. 9A and 9B.

EXAMPLE 1

In FIG. 9A, the module portion MOS in the information processing portion 133 of the integrated controller 103a has two equipment-side objects having an OID "electric locking device" used to control the electric locking device 101c and an OID "air conditioning device" used to control the air conditioning device 101b. The former equipment-side object has an interface defining a function for locking, and an IID "locking" is assigned to the interface. The later equipment-side object has an interface defining a function for stopping the air conditioning operation, and an IID "air conditioning" is assigned to the interface. When an execution request is performed by use of the OID and the IID, the information processing portion 133 executes processing of sending, as a function, control information for stopping the operation of the air conditioning device 101b or control information for locking of the electric locking device 101c to the function portion 130 of the integrated controller 103a through the module portion MOS. According to the received control information, the function portion 130 executes processing of sending a control signal for stopping the operation of the air conditioning device 101b or a control signal for locking the electric locking device 101c through the corresponding signal line 113.

On the other hand, the service function portion OAS of the gateway 108 has the sever-side object, to which an OID "outing" is assigned. This sever-side object has an interface defining a function for executing the locking of the electric locking device 101c, and an IID "locking" is assigned to this interface. The sever-side object is programmed such that upon a receipt of an execution request with use of this IID, an execution request is performed to the IID "locking" of the equipment-side object with the OID "electric locking device" and the IID "air conditioning" of the equipment-side object with the OID "air conditioning device" in the module portion MOS of the information processing portion 133 of the previously associated integrated controller 103a according to the combination information of the OID and the IID stored in the correspondence relation setting table described above.

That is, the service function portion OAS has an identifier setting portion (correspondence relation setting function) for previously setting the correspondence relation between the combination information of the OID and the IID of the server-side object and the combination information of the OID and the IID of the equipment-side object in a table format. Referring to the table prepared by this correspondence relation setting function, the above-mentioned execution request is performed. Table 1 is an example of the correspondence relation setting table.

TABLE 1

| Serve-side object | Equipment-side object |
| --- | --- |
| OID "outing" IID "locking" | OID "electric locking device" IID "locking" OID "air conditioning device" IID "air conditioning" |

When it is needed to stop the operation of the air conditioning device 101b and lock the electric locking device 101c at the time where the user goes out, the execution request of the server-side object is sent from the client terminal device 110a to the service function portion OAS of the gateway 108 by use of the OID "outing" and the IID "locking" of the sever-side object. As a result of this execution request, the user can receive two services of stopping the operation of the air conditioning device 101b and locking the electric locking device 101c. That is, according to the execution request from the client terminal device 110a, the service function portion OAS of the gateway 108 executes the server-side object, so that execution requests of the equipment-side objects are sent to the module portion MOS of the integrated controller 103a by use of the IID "locking" of the equipment-side object with the OID "electric locking device" and the IID "air conditioning" of the equipment-side object with the OID "air conditioning device". Thereby, the module portion MOS of the integrated controller 103a executes the equipment-side objects, and the function portion 130 sends the control signal for stopping the operation of the air conditioning device 101b and the control signal for locking the electric locking device 101c respectively to the air conditioning device 101b and the electric locking device 101c through the corresponding signal lines 113. Thus, the two services of stopping the operation of the air conditioning device 101b and locking the electric locking device 101c can be achieved.

In addition, when the same execution request of the server-side object is sent from the client terminal device 110b on the Internet 109 to the gateway 108, it is transmitted to the gateway 108 by way of the center server 112 on the Internet 109, so that the same services can be achieved.

Thus, according to the execution request of one of the server-side objects on the service function portion OAS from the client terminal device (110a or 110b), the gateway 108 performs the execution request of the plural equipment-side objects of the equipments 103, which are previously associated with the server-side object. As a result, it becomes possible to enjoy the plural services.

EXAMPLE 2

In the above example 1, one of the equipments 103 has the plural equipment-side objects, and the gateway 108 performs the execution requests to those equipment-side objects. In this example, the gateway 108 performs an execution request of the equipment-side object to each of plural equipments, for example, the integrated controllers 103a, 103b. That is, as shown in FIG. 9B, the service function portion OAS of the gateway 108 simultaneously performs execution requests to both of the equipment-side object with the OID "electric locking device" and the IID "locking" of the interface in the module portion MOS of the information processing portion 133 of the integrated controller 103a, and the equipment-side object with the OID "air conditioning device" and the IID "air conditioning" of the interface in the module portion MOS of the information processing portion 133 of the integrated controller 103b.

That is, as in the above-described case, the service function portion OAS of the gateway 108 has a server-side object with the OID "outing", and the server-side object has an interface, to which an IID "locking" is assigned, defining a function for executing the locking of the electric locking device 101c. Upon a receipt of an execution request with use of this IID, the gateway 108 performs an execution request to the IID "locking" of the previously associated equipment-side object with the OID "electric locking device", and simultaneously performs an execution request to the IID "air conditioning" of the previously associated equipment-side object with the OID "air conditioning device".

In this case, the requested equipment-side objects are in the integrated controllers (103a, 103b), respectively. However, since the service function portion OAS of the gateway 108 refers to the connected equipment information table and the above table (see Table 1) showing the correspondence relation between the combination information of the OID of the equipment-side object and the IID of the interface under the object and the combination information of the OID and the IID of the server-side object, it is possible to perform the execution requests to the equipment-side objects of the module portions MOS of the integrated controllers (103a, 103b), respectively.

In the above example 1, plural different equipments can be simultaneously controlled under the integrated controller 103a. In the example 2, the plural different equipments can be simultaneously controlled under the integrated controllers (103a, 103b). As another example, for example, by performing an execution request of the server-side object to the service function portion OAS of the gateway 108 from the client terminal device 110a (or 110b), it is also possible to provide services of reducing illumination intensity of the lighting apparatus 101a under the integrated controller (103a and/or 103b), and simultaneously activating the recorded-image transfer device 103d to provide the recorded image on a monitor device (not shown) on the LAN 106. That is, the equipment-side object of the module portion MOS of the recorded-image transfer device 103d is programmed to execute transferring of the recorded-image data, and the equipment-side object of the module portion MOS of the integrated controller (103a, 103b) is programmed to execute illumination adjustment of the light apparatus 101a. The server-side object of the service function portion of the gateway 108 is programmed such that execution requests to the OID and the IID of the associated equipment-side objects are performed upon the receipt of an execution request from the client terminal device (110a, 110b). Thereby, it becomes possible to enjoy the combination of services described above according to one execution request of the server-side object from the client terminal device (110a, 110b).

In the above examples 1 and 2, the server-side object has the single interface. The server-side object may have two or more interfaces. In this case, the equipment-side object is associated with each of the interfaces (IID). When an execution request of the server-side object is performed from the client terminal device (110a, 110b) by use of the combination information of the OID and a desired one of the interfaces (IID), one of various equipments can be selected as an equipment to be controlled. For example, as shown in Table 2, a server-side object with a unique identifier (OID) of "1" has an interface identifier (IID) defined according to a service content "α" of the server-side object and an interface identifier (IID) defined according to another service content "β" of the server-side object. In this case, the correspondence relation between each of the interfaces of the server-side object and the combination information of the unique identifier (OID) of the equipment-side object and the interface identifier (IID) defined according to a function of the equipment executing the equipment-side object is set in the correspondence relation setting table. As described in the example 1, this correspondence relation setting table is stored in the identifier setting portion of the service function portion OAS.

TABLE 2

| Server-side object | Equipment-side object |
| --- | --- |
| OID "1" | OID "A" IID "function A1" |
| IID "service content α" | OID "B" IID "function B1" |
| OID "1" | OID "A" IID "function A2" |
| IID "service content β" | OID "C" IID "function C1" |

In the present embodiment, the equipments can be simultaneously controlled without increasing communication traffic between the gateway 108 and the client terminal device (110a, 110b). In addition, when the number of the equipments to be controlled is increased or decreased, it is possible to easily cope with such a case by simply changing the combination information of the OID and the IID of the equipment-side object(s) of the equipment(s), to which the execution request is performed from the service function portion OAS of the gateway 108, by the correspondence relation setting function, as described above. Furthermore, plural services can be simultaneously achieved according to one execution request by adequately setting the correspondence relation between the server-side object and the equipment-side object(s) of the equipment(s), to which the execution request is performed by executing the server-side object at the service function portion OAS of the gateway 108. Therefore, even when changing the services provided simultaneously, no program change is needed in the client terminal device (110a, 110b) or the module portion MOS of the information processing portion 133 of the equipment(s) 103.

(Third Embodiment)

As explained above, the network system of the second embodiment is characterized in that the lighting apparatus 101a, air conditioning device 101b, the electric locking device 101c are controlled by the integrated controller (103a, 103b). The present embodiment is different from the second embodiment in that configurations of FIG. 6A needed as the equipment are mounted in each of the lighting apparatus 101a, air conditioning device 101b and the electric locking device 101c. Therefore, these equipments are object mounting-type equipments.

In addition, as the equipment-side object of the module portion MOS of the information processing portion 133, which is mounted in the equipment such as the lighting apparatus 101a, the air conditioning device 101b or the electric locking device 101c, the present embodiment uses an object programmed such that prescribed control information is given to the function portion 130 peculiar to the equipment.

On the other hand, the service function portion OAS of the gateway 108 previously installs, in the connected equipment information table, the correspondence relation between the IP address of the equipment and the combination information of OID of the equipment-side object and IID of the interface under the object of the module portion MOS of each of these equipments.

As in the case of the above example 2, an object programmed such that execution requests are performed to the OID and the IID of the equipment-side objects of the module portions MOS of previously associated equipments is used as the server-side object of the service function portion OAS. Therefore, upon a receipt of an execution request of the server-side object from the client terminal device 110a or 110b, execution requests are performed to the OID and the IID of the equipment-side objects of the module portions MOS of the previously associated equipments by executing the server-side object, as described in the example 2. As a result, the prescribed services can be simultaneously achieved by these equipments.

In addition, when the same execution request is performed to the object of the gateway 108 from the client terminal device 110*b* on the Internet 109, it is transferred to the gateway 108 by way of the center server 112 connected to the Internet 109, and then processing is performed, as in the above case.

Thus, according to the execution request performed to one of the server-side objects on the service function portion OAS from the client terminal device (110*a*, 110*b*), the execution requests are then performed to the plural equipment-side objects previously associated with the server-side object. Thus, it is possible to enjoy the prescribed plural services of the equipments.

According to the remote control system of the present invention, it is possible to simultaneously control the plural equipments without increasing communication traffic between the client terminal device (110*a*, 110*b*) and the gateway 108. In addition, even when the number of the equipments 103 to be controlled is increased or decreased, it is possible to easily cope with such a case by simply changing the combination information of the OID and the IID of the equipment-side object(s) of the equipment(s) 103, which receive the execution request from the service function portion OAS of the gateway 108, by the correspondence relation setting function described above. Furthermore, plural services can be simultaneously achieved according to one execution request by adequately setting the correspondence relation between the server-side object and the equipment-side object(s) of the equipment(s), to which the execution request is performed by executing the server-side object at the service function portion OAS of the gateway 108. Therefore, even when changing the services provided simultaneously, no program change is needed in the client terminal device (110*a*, 110*b*) or the module portion MOS of the information processing portion 133 of the equipment(s) 103.

As described in the second and third embodiments, the service-function portion OAS of the gateway 108 has the server-side object described above. Alternatively, a service function portion OAS mounted in a server on the Internet 109 such as the center server 112 may have the server-side object.

In the second and third embodiments, it was explained about the case where the equipments are only controlled. When another execution request is simultaneously performed to an object having an interface, in which different information (variable and function or function and event information) is defined, it becomes possible to simultaneously achieve different kinds of services, i.e., controlling and monitoring services. In brief, according to the technical concept of the present invention, a remote monitoring/control system having both of the remote monitoring system of the first embodiment and the remote control system of the second and third embodiments can be realized in response to the client's needs.

Industrial Applicability

As described above, according to the network system of the present invention, it is possible to control the equipments in a lump sum or individually monitor the equipments without considering specific identification information of the equipments such as IP address, and flexibly cope with the client's needs even when increasing the number of the equipments. When the network system of the present invention is used as a remote control system, a wide variety of control services of the equipments can be provided without changing communication traffic between the client terminal device and the server. On the other hand, when the network system of the present invention is used as a remote monitoring system, the number of service information to be provided to the client terminal device can be increased or decreased at the server side according to the information amount requested by the client terminal device without changing the equipments.

Thus, since the present invention can achieve comfortable safe living and working spaces by controlling/monitoring the equipments located far away by use of a portable network equipment, a personal computer or the like, it is expected to be widely utilized as the next generation network system.

The invention claimed is:

1. A network system comprising at least one equipment, a client terminal device, and a server connected between said equipment and said client terminal device via a network, and configured such that said client terminal device requests an execution of a server-side object to said server, and then said server requests an execution of an equipment-side object to said equipment, the execution request of said server-side object from said client terminal device is performed by use of a first identifier assigned to said server-side object, and the execution request of said equipment-side object from said server is performed by use of a second identifier assigned to said equipment-side object, said second identifier comprises a unique identifier of said equipment-side object and an interface identifier defined according to a function of said equipment, which executes said equipment-side object according to the execution request of said server-side object using said first identifier from said client terminal device, said server has a service provision function portion, a service request function portion, and an identifier setting portion configured to set a correspondence relation between said first identifier and said second identifier, said correspondence relation between said first identifier and at least one of said unique identifier and said interface identifier of said second identifier is set in said identifier setting portion, said service provision function portion has said server-side object and is configured to, upon receiving the execution request of said server-side object using said first identifier from said client terminal device, execute said server-side object corresponding to said first identifier, said service request function portion is configured to, when said server-side object is executed, perform the execution request of said equipment-side object using said second identifier including said unique identifier of said equipment-side object or said interface identifier corresponding to said first identifier to said equipment via the network with reference to said correspondence relation set by said identifier setting portion, said equipment has said equipment-side object, and is configured to, when the information processing portion receives said execution request of said equipment-side object using said second identifier, execute said equipment-side object corresponding to said second identifier, and said identifier setting portion is configured such that the number of said second identifier of said equipment-side object associated with said first identifier of said server-side object is increased or decreased in response to an increase or decrease in the number of services provided when said equipment executes said equipment-side object according to the execution request of said server-side object from said client terminal device.

2. The network system as set forth in claim 1, wherein
said first identifier includes a unique identifier of said server-side object and at least one interface identifier defined according to contents of a provision service for client,
said second identifier includes a unique identifier of said equipment-side object and at least one interface identifier defined according to a function of said equipment, and
the correspondence relation between a combination of said unique identifier and said at least one interface identifier of said first identifier and a combination of said unique identifier and said at least one interface identifier of said second identifier is set in said identifier setting portion.

3. The network system as set forth in claim 1, wherein
said at least one equipment comprises a plurality of equipments having equipment-side objects with different second identifiers, and
the correspondence relation between said first identifier and said second identifiers is set in said identifier setting portion such that said server performs execution requests of said equipment-side objects to said equipments by use of said different second identifiers according to the execution request of said server-side object using said first identifier from said client terminal device.

4. The network system as set forth in claim 1, wherein
said at least one equipment comprises an equipment having a plurality of equipment-side objects with different second identifiers, and
the correspondence relation between said first identifier and said second identifiers is set in said identifier setting portion such that said server performs execution requests of said equipment-side objects to said equipment by use of said different second identifiers according to the execution request of said server-side object using said first identifier from said client terminal device.

5. The network system as set forth in claim 1, wherein
said equipment comprises a function portion configured to execute processing for providing a service of said equipment, and an information processing portion configured to give to and receive from said function portion information defined in said equipment-side object and needed to provide the service,
said service request function portion is configured to perform the execution request of said equipment-side object using said second identifier to said equipment via the network, and give to and receive from said equipment information corresponding to the service.

6. The network system as set forth in claim 5, wherein the information defined in said equipment-side object is an operation instruction function for service provision, which is given from said information processing portion to the said function portion when said equipment-side object is accessed from said server.

* * * * *